United States Patent [19]

Frye

[11] 4,368,236

[45] Jan. 11, 1983

[54] SILICONE RESIN COATING COMPOSITIONS

[75] Inventor: Robert B. Frye, Menands, N.Y.

[73] Assignee: General Electric Co., Waterford, N.Y.

[21] Appl. No.: 283,832

[22] Filed: Jul. 16, 1981

Related U.S. Application Data

[60] Division of Ser. No. 91,716, Nov. 6, 1979, Pat. No. 4,299,746, which is a continuation-in-part of Ser. No. 964,911, Nov. 30, 1978, Pat. No. 4,277,287.

[51] Int. Cl.$^3$ .............................................. B32B 27/36
[52] U.S. Cl. .................................... 428/412; 428/429; 428/447; 428/450; 428/451
[58] Field of Search ............... 428/412, 447, 429, 450, 428/451; 524/338, 588

[56] References Cited

U.S. PATENT DOCUMENTS

| | | | |
|---|---|---|---|
| 3,708,225 | 1/1973 | Misch et al. | 351/160 |
| 3,976,497 | 8/1976 | Clark | 106/287 SE |
| 3,986,997 | 10/1976 | Clark | 260/29.2 M |
| 4,159,206 | 6/1979 | Armbruster et al. | 106/287.12 |
| 4,177,315 | 12/1979 | Ubersax | 428/336 |

*Primary Examiner*—Theodore E. Pertilla
*Attorney, Agent, or Firm*—Hedman, Casella, Gibson & Costigan

[57] ABSTRACT

An improved silicone resin abrasion resistant coating composition is provided, the coating composition having a pH in the range of from 6.8–7.8 and prepared by hydrolyzing an alkyltrialkoxysilane or aryltrialkoxysilane in an aqueous colloidal silica dispersion and adding thereto a small amount of an ultraviolet light absorbing compound, such as 2,4-dihydroxybenzophenone, to the hydrolysis product.

11 Claims, No Drawings

SILICONE RESIN COATING COMPOSITIONS

This is a division, of application Ser. No. 91,716 filed Nov. 6, 1979 now U.S. Pat. No. 4,299,746, which is a continuation-in-part of application Ser. No. 964,911, filed Nov. 30, 1978, U.S. Pat. No. 4,277,287.

BACKGROUND OF THE INVENTION

This invention relates to a protective coating composition. More particularly, it relates to a silicone resin coating composition which, when applied to a substrate, forms a protective, abrasion-resistant and discoloration-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant, transparent plastics. The lighter weight of these plastics its comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and oftentimes requires replacement of the glazing or lens or the like. Another shortcoming of some transparent plastics is that under continuous exposure to ultraviolet light the surface of the plastic will eventually discolor, e.g., yellow, as the result of a chemical breakdown of the polymer structure.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Polycarbonate, however, is particularly sensitive to discoloration from ultraviolet light exposure.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

Copending U.S. application Ser. No. 964,910, filed Nov. 30, 1978, discloses another abrasion-resistant coating composition. This coating composition has been found to be highly desirable as a protective finish for plastic, as well as metal or metallized substrates. A particularly significant area of application for this coating is in the glazing and optical lens industry. Since these areas require a coating of high optical clarity, coatings which show flowmarks, dirtmarks or other marks which may impair visibility, are undesirable. In copending U.S. application Ser. No. 964,911, filed on Nov. 30, 1978, it is disclosed that the addition of a small amount of a polysiloxane polyether copolymer to the coating compositions disclosed therein eliminates the occurrence of undesirable flowmarks and the like, as well as providing other improvements in the hard resistance coating.

It has now been discovered that if certain ultraviolet light absorbing compounds are incorporated into the coating compositions disclosed and claimed in said copending U.S. Ser. No. 964,911, and these coating compositions are applied to the surface of a plastic substrate, such as polycarbonate, not only is an excellent mar resistant coating provided but the service life of the substrate is even more extended by the prevention of discoloration and delamination which is usually associated with these substrates.

SUMMARY OF THE INVENTION

Accordingly, it is one object of the present invention to provide a new protective coating resin for solid substrates.

Another object of this invention is to provide a coating resin for solid substrates which, when applied to the substrate, will provide an abrasion-resistant surface thereto.

Still another object of the present invention is to provide a coating composition, especially well suited for providing an abrasion resistant coating surface to transparent substrates.

A further object of this invention is to provide a protective coating resin which is readily applicable to a substrate and which, when applied, provides an improved coating having good resistance to moisture and humidity.

Another object of this invention is to provide a protective coating resin which when applied to a plastic substrate prevents discoloring of the surface of the substrate.

These and other objects are accomplished herein by a silicone resin coating composition comprising (i) a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$; and (ii) a small amount of an ultraviolet light absorbing compound; said composition containing 10 to 50 weight percent solids, said solids consisting essentially 10 to 70 weight percent colloidal silica and 30 to 90 weight percent of the partial condensate, and wherein said composition has a pH of from 6.8 to about 7.8.

DETAILED DESCRIPTION OF THE INVENTION

The coating compositions of this invention are prepared by hydrolyzing a trialkoxysilane or a mixture of trialkoxysilanes of the formula $R'Si(OR)_3$, wherein R' is alkyl of from 1 to 3 carbons or aryl, such as phenyl, and R is alkyl, in an aqueous dispersion of colloidal silica, and thoroughly admixing an ultraviolet light absorbing compound therewith.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purposes of this invention, basic colloidal silica sols are preferred. However, acidic colloidal silicas are also contemplated. In addition, it has been found that colloidal silicas having a low alkali content (e.g., Na$_2$O) yield a more stable coating composition. Thus, colloidal silica having an alkali content of less than 0.35% (calculated as Na$_2$O) is preferred. Moreover, colloidal silicas having average particle size of from 10 to 30 millimicrons are also preferred. A particularly preferred one for the purposes herein is known as Ludox LS, sold by duPont Company.

In accordance with this invention, the aqueous colloidal silica dispersion is added to a solution of a small amount of alkyltriacetoxysilane or acetic acid in alkyltrialkoxysilane or aryltrialkoxysilane. The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 12 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed. The solids content of the coating composition of this invention is generally preferred to be in the range of from about 18 to 25%, most preferably about 20%, by weight of the total composition, consisting essentially of about 32 weight percent colloidal silica, about 64 weight percent of the partial condensate and about 4 weight percent of the ultraviolet light absorber to be discussed in more detail hereinafter. The pH of the resultant resin composition (i.e. prior to addition of ultraviolet light absorber) is in the range of from about 7.1 to about 7.8. If necessary, dilute base, such as ammonium hydroxide, or weak acid, such as acetic acid may be added to the composition to adjust the pH to the desired range.

The polysiloxane polyether copolymers, disclosed in said copending U.S. application Ser. No. 964,911, which act as flow control agents, may optionally be added to the compositions herein after the hydrolysis is completed. Preferably, however, they may be added to the composition after the initial solids content has been diluted with alcohol. As indicated, the polysiloxane polyether copolymer acts as a flow control agent and thereby prevents flowmarks, dirtmarks, and the like, on the surface of the substrate to which the coating is subsequently applied. For the purposes of this invention, the polysiloxane ether copolymer may be employed in an amount of from about 2.5 to about 15% by weight of the total solids of the composition. Most advantageous results may be achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive is found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the alcohol-water cosolvent system of the compositions herein and becomes a permanent part of the cured coating, not removed by washing, even with soap and water.

More specifically, some of the polysiloxane polyether copolymers which may be used in the practice of the invention herein are liquid organopolysiloxane copolymers having the formula:

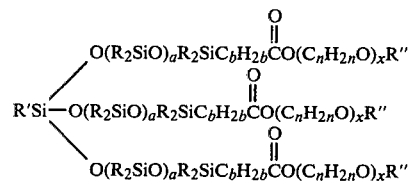

where R and R' are monovalent hydrocarbon radicals; R" is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R and R' in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. R" is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula R is preferably methyl, R' is preferably methyl, R" is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141, made by General Electric Company, BYK-300, sold by Mallinckrodt, L-540, L-538, sold by Union Carbide, and DC-190, sold by Dow Corning.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1-6 carbon atoms can be used, alkyl groups having from 1 to 3 carbon atoms being preferred. Methyltriacetoxysilane is most preferred.

The silanetriols, RSi(OH)3, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

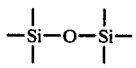

bonding occurs. This condensation takes place over a period of time and is not an exhausting condensation but rather the siloxane retains an appreciable quantity of silicon-bonded hydroxyl groups which render the polymer soluble in the alcohol-water cosolvent. It is believed that this soluble partial condensate can be characterized as a siloxanol polymer having at least one silicon-bonded hydroxyl group per every three

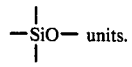 units.

The non-volatile solids portion of the coating composition herein is a mixture of colloidal silica and the partial condensate (or siloxanol) of a silanol. The major portion or all of the partial condensate or siloxanol is obtained from the condensation of CH3Si(OH)3 and, depending upon the input of ingredients to the hydrolysis reaction, minor portions of partial condensate can be obtained, for example, from the condensation of CH3Si(OH)3 with C2H5Si(OH)3 or C3H7Si(OH)3; CH3Si(OH)3 with C6H5Si(OH)3, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The ultraviolet light absorbing compounds used in accordance with the present invention must be soluble in, and otherwise compatible with, the silicone resin hydrolyzate. A particularly preferred compound is 2,4-dihydroxybenzophenone, known commercially as Uvinul 400, sold by GAF. This compound is fully soluble in the silicone resin hydrolyzate, and furthermore is particularly effective in protecting polycarbonate from discoloration when the present coating compositions are applied to the surface thereof. Moreover, the presence of the 2,4-dihydroxybenzophenone does not detract from the otherwise excellent abrasion-resistance, moisture resistance, and adhesion, shelf-life and absence of color, afforded by the silicone resin hydrolyzate.

Other substituted hydroxybenzophenone ultraviolet light absorbers which have been found to be soluble in the silicone resin hydrolyzate and which prevent discoloration of the substrate are 2-hydroxy-4-methoxy benzophenone and 2,2'-dihydroxy-4-methoxybenzophenone.

Any amount of ultraviolet light absorber which is effective to prevent discoloration of the substrate to which the composition will be applied can be used herein. In general, it has been found that best results are obtained if the ultraviolet light absorber is employed in amounts of from 3-5% by weight of the total solids of the coating composition.

It has been found that a particularly excellent coating composition is obtained if, after thoroughly admixing the ultraviolet light absorber with the resin hydrolyzate, the total admixture is allowed to age before use. By aging, it is meant standing at room temperature from about 5 to 10 days. While the nature of aging process with respect to the compositions of this invention is not fully understood, it is believed that the ultraviolet light absorber is actually being incorporated into the structure of the hydrolyzate resin, perhaps by transesterification. In any event, it has been found that if the compositions of this invention are not aged after the addition of the ultraviolet light absorber inferior adhesion of the coating to the substrate and poorer abrasion resistance may result. It has also been found that the addition of the ultraviolet light absorber may cause the pH of the resin hydrolyzate to drop slightly. Thus, the final coating compositions herein have a pH in the range of from 6.8 to about 7.8.

The coating compositions of this invention will cure on a substrate at temperatures of, for example, 120° C. without the aid of an added curing catalyst. Depending on the concentration of ultraviolet light absorber employed, the curing time will vary from about 30 to 120 minutes. If one wishes to employ more desirable milder curing conditions, and/or decrease the cure time, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as mar-resistant and discolorable resistant coatings for polycarbonates, such as those polycarbonates known as Lexan®, sold by General Electric Company. The metal substrates on which the present protective coatings are utilized include bright and dull metals like aluminium and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLES 1–3

22.1 parts by weight of Ludox LS, silica sol (aqueous dispersion of colloidal silica, average particle size is 12 millicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. One gram (5% of solids) of silicone polyether flow control agent (SF-1066, General Electric) is added. The resulting resin is allowed to age at room temperature for at least 48 hours before 2,4-dihydroxybenzophenone (2,4-DHBP; Uvinul 400, GAF Corp.) is added to portions of the resin at 3%, 4% and 5% by weight of solids.

After stirring to dissolve the compound, the product is again allowed to age for at least 72 hours. Another portion of the aged resin is kept without 2,4-DHBP as a control. Each of these formulations is flow-coated onto a 6"×8" panel of transparent Lexan® polycarbonate primed with a dilute thermosetting acrylic emulsion. The coated panels are air dried for 30 minutes and cured at 120° C. for 60 minutes. The resultant hard coatings are smooth and optically clear. Abrasion resistance is determined using a Taber Abraser (with a 500 g load and CS-10F wheels) for 500 cycles and measuring the change in percent haze ($\Delta\%H$). Resistance to moisture and light are evaluated on a QUV Accelerated Weathering Tester (4h UV cycle at 50° C./4H condensation cycle at 45° C.) by rapidly measuring scribed adhesion (3 tape pulls on a scribed crisscross pattern) on a panel removed from the condensation cycle and patted dry with a towel. The results are displayed in the following table:

| Example | 2,4-DHBP | $\Delta\%\ H_{500}$ | Hours until Adhesion Failure in the QUV | Viscosity After Storage for 90 days at Room Temp. |
|---|---|---|---|---|
| Control | 0% | 1.9 | 270 | 6.9 cstk |
| 1 | 3% solids | 2.5 | 800 | 6.9 cstk |
| 2 | 4% solids | 2.2 | 900 | 6.9 cstk |
| 3 | 5% solids | 2.9 | 1100 | 6.9 cstk |

The thermosetting acrylic emulsion primer referred to above is Rhoplex AC 658 sold by Rohm & Haas, a copolymer of n-butylmethacrylate and methylmethacrylate having hydroxy functionality crosslinked with a substituted melamine, diluted to 4% solids by using a mixture of 875 parts by weight distilled water, 470 parts by weight 2-butoxyethanol and 125 parts by weight Rhoplex AC 658.

EXAMPLES 4–6

A silicone resin is prepared at 20% solids according to the procedure described in Examples 1–3 and again 2,4-DHBP is added at 0% (control), 3%, 4%, and 5% of solids and the resulting compositions are permitted to stand at room temperature for three months. Plaques of Lexan® polycarbonate are primed with the same thermosetting acrylic emulsion described above and then coated in duplicate with these formulations. After air drying for 30 minutes, the panels are cured at 120° C. for either 15 or 60 minutes. The abrasion resistance at the various concentrations and cure times is determined using the Taber Abrazer and a hazemeter (Gardner). The results are shown in the following table:

| | CURE SCHEDULE | |
|---|---|---|
| | $\Delta\%$ Haze after curing at 120° C. for: | |
| 2,4-DHBP | 15 min. | 60 min. |
| 0% | 3.3 | 2.3 |
| 3% | >20.1 | 3.5 |
| 4% | >20 | 3.8 |

EXAMPLE 7

A silicone resin is prepared at 20% solids according to the procedure described in Example 1 and 2,4-DHBP is added at 5% of solids by weight to a portion of the formulation. After ageing for several days at room temperature the composition is applied to plaques of Plexiglas acrylic and Lexan ® polycarbonate primed with the thermosetting acrylic emulsion described above. The panels are cured at 93° C. for periods of 2 or 4 hours. The abrasion resistance of these coatings is evaluated using a Taber Abraser and a Gardner Hazemeter.

| Substrate | Cure Schedule | Control (0%, 2,4-DHBP) Δ % Haze (500 cycles) | 2,4-DHBP(5%) Δ % Haze (500 cycles) |
|---|---|---|---|
| Primed Acrylic | 2h/93° C. | 0.7 | 13.2 |
| Primed Acrylic | 4h/93° C. | 1.6 | 12.5 |
| Primed Polycarbonate | 2h/93° C. | 0.5 | 3.6 |
| Primed Polycarbonate | 4h/93° C. | 2.2 | 3.5 |

EXAMPLE 8

A silicone resin formulation containing 2,4-DHBP at 5% of solids is prepared as in Example 7. The cure catalysts sodium acetate (hydrate) and tetramethylammonium acetate (a 3% solution in methanol) is added to portions of coating resin at 0, 0.25, and 0.5% of solids. The resulting compositions are flowcoated onto Lexan ® polycarbonate panels primed with the thermosetting acrylic emulsion described above. After air drying for 30 minutes, the coated panels are cured in a 120° C. oven for periods of 15, 30, 45, or 60 minutes. The degree of cure is measured by abrasion resistance using a Taber Abraser (CS-10F wheels, 500 g load) and a Gardner Hazemeter).

| | Cure Time vs Catalyst | | |
|---|---|---|---|
| | Δ % Haze 500 Cycles after 120° C. for: | | |
| Catalyst | 15 min. | 30 min. | 60 min. |
| None | 6.8 | 4.5 | 3.2 |
| None | 5.5 | 4.3 | 3.2 |
| 0.25% NaOAc*.H₂O | 4.8 | 3.4 | 2.7 |
| 0.50% NaOAc.H₂O | 4.5 | 3.2 | 2.5 |
| 0.25% TMAA** (3% in MeOH) | 6.3 | 4.5 | 2.8 |
| 0.50% TMAA (3% in MeOH) | 7.0 | 3.8 | 3.2 |

*Sodium acetate
**Tetramethylammonium acetate

EXAMPLE 9-11

A silicone resin formulation containing 2,4-DHBP at 0%, 3%, 4% and 5% of solids is prepared as in Example 7. Lexan ® polycarbonate plaques are primed with the acrylic emulsion described above and coated with these formulations and cured for 60 minutes at 120° C. The change in % haze after 500 cycles on a Taber Abraser (500 g load, CS-10F wheels) is 1.9 for the control, 2.5 for the 3% DHBP, 2.2 for the 4% DHBP, and 2.9 for the 5% DHBP. These plaques are placed in a QUV Accelerated Weathering Tester using a 4-hour irradiation cycle at 50° C. and a 4-hour condensation cycle at 45° C. The yellowness index is measured daily using a tristimulus colorimeter with yellowness index (YI) circuitry (Hunter Lab). After 279 hours the control sample begins to lose scribed adhesion, the plaques with DHBP retain adhesion. Some representative yellowness data are tabulated below:

| | Exposure and YI | | | | | | | |
|---|---|---|---|---|---|---|---|---|
| Sample | QUV Hours | YI | QUV Hours | YI | QUV Hours | YI | QUV Hours | YI |
| Control | 0 | 1.5 | 279 | 7.6 | 535 | — | 819 | — |
| 3% DHBP | 0 | 1.8 | " | 3.1 | " | 5.1 | " | 9.3 |
| Duplicate | 0 | 1.8 | " | 3.4 | " | 5.9 | " | — |
| 4% DHBP | 0 | 1.9 | " | 2.2 | " | 4.1 | " | 7.4 |
| Duplicate | 0 | 1.9 | " | 2.0 | " | 3.9 | " | 6.8 |
| 5% DHBP | 0 | 2.0 | " | 2.1 | " | 3.6 | " | 5.8 |
| Duplicate | 0 | 2.0 | " | 2.1 | " | 3.4 | " | 5.7 |

Obviously, other modifications and variations of the present invention are possible in light of the above teachings. For example, for added protection, the ultraviolet light absorbers disclosed herein may also be added to the primers which may be used. Other primers useful herein include Rhoplex 1230, a thermosetting acrylic emulsion or an ethanol-isobutanol solution containing 1.5 weight percent of gamma-aminopropyl triethoxysilane and 1.5 weight percent of a preformed reaction product of gamma-aminopropyltriethoxysilane and maleic anhydride.

It is to be understood, therefore, that changes may be made in the particular embodiments of the invention described which are within the full intended scope of the invention as defined by the appended claims:

I claim:

1. A solid substrate having at least one surface coated with an aqueous coating composition comprising in intimate admixture:
   (a) a dispersion of colloidal silica in a lower aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$; and
   (b) a small amount of an ultraviolet light absorbing compound, said composition containing 10 to 50 weight percent solids, said solids consisting essentially of 10 to 70 weight percent colloidal silica and 30 to 90 weight percent of the partial condensate, and wherein said composition has a pH of from 6.8 to 7.8.

2. An article as defined in claim 1 wherein the solid substrate is comprised of a synthetic organic polymer.

3. An article as defined in claim 2 wherein said polymer is a transparent polymer.

4. An article as defined in claim 3 wherein said polymer is a polycarbonate.

5. An article as defined in claim 4 wherein said polycarbonate is transparent.

6. An article as defined in claim 4 wherein said polycarbonate is a poly(bisphenol-A carbonate).

7. An article as defined in claim 1 wherein the aqueous coating composition has been cured on said surface of said solid substrate.

8. An article as defined in claim 1 wherein said surface has been primed with a thermosetting acrylic emulsion prior to being coated with said aqueous coating composition.

9. An article as defined in claim 8 wherein said aqueous coating composition has been aged and contains a small amount of a polysiloxane polyether copolymer.

10. An article as defined in claim 9 wherein the ultraviolet light absorber in said aqueous coating composition is a substituted hydroxy benzophenone.

11. An article as defined in claim 10 wherein said substituted hydroxybenzophenone is 2,4-dihydroxybenzophenone.

* * * * *